US012558614B2

(12) United States Patent
Chi et al.

(10) Patent No.: US 12,558,614 B2
(45) Date of Patent: Feb. 24, 2026

(54) GAMING CONTROLLER POWER MANAGEMENT IN DYNAMIC GAMING ENVIRONMENT

(71) Applicant: Dell Products L.P., Round Rock, TX (US)

(72) Inventors: Wei-Hsiang Chi, Taipei (TW); Tyler Ryan Cox, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 327 days.

(21) Appl. No.: 18/354,791

(22) Filed: Jul. 19, 2023

(65) Prior Publication Data

US 2025/0025771 A1     Jan. 23, 2025

(51) Int. Cl.
*A63F 13/22*     (2014.01)
*A63F 13/211*     (2014.01)
*A63F 13/235*     (2014.01)

(52) U.S. Cl.
CPC ............ *A63F 13/22* (2014.09); *A63F 13/211* (2014.09); *A63F 13/235* (2014.09)

(58) Field of Classification Search
CPC ....... A63F 13/22; A63F 13/211; A63F 13/235
See application file for complete search history.

(56) References Cited

U.S. PATENT DOCUMENTS

2022/0100281 A1*   3/2022   Nocon .................. G06F 3/0346

* cited by examiner

*Primary Examiner* — Peter J Iannuzzi
(74) *Attorney, Agent, or Firm* — Norton Rose Fulbright US LLP

(57)     ABSTRACT

A user profile may be used to adjust one or more system power management settings of an information handling system. An information handling system may transmit one or more user profile credentials. The information handling system may receive user profile data and may compare the user profile data with one or more system characteristics of the information handling system. Based on the comparison of the user profile data with the system characteristics of the information handling system, the information handling system may adjust one or more power management settings of the information handling system.

11 Claims, 8 Drawing Sheets

500

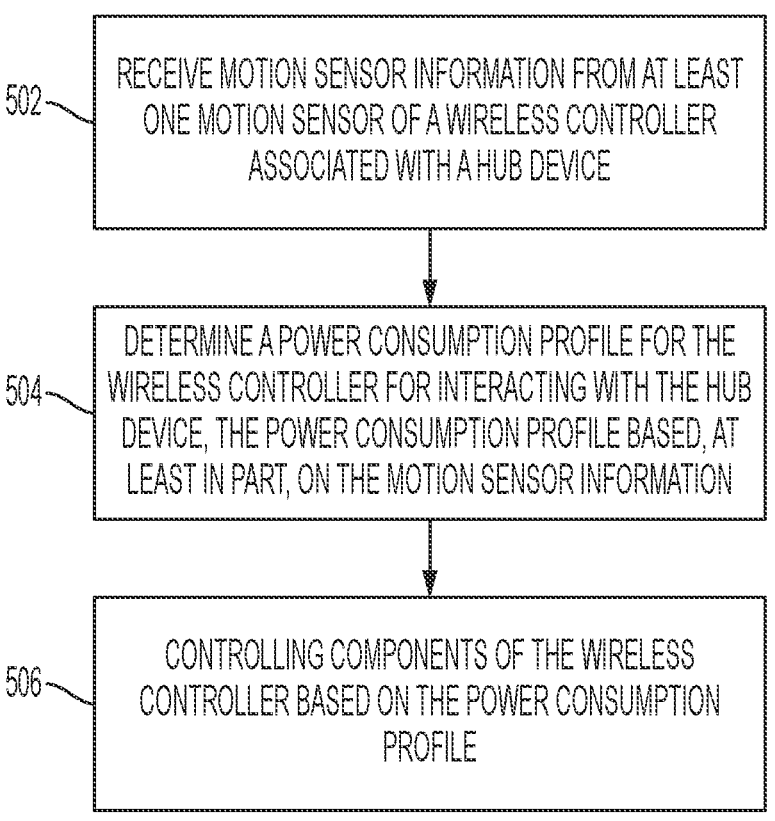

RECEIVE MOTION SENSOR INFORMATION FROM AT LEAST ONE MOTION SENSOR OF A WIRELESS CONTROLLER ASSOCIATED WITH A HUB DEVICE

502

DETERMINE A POWER CONSUMPTION PROFILE FOR THE WIRELESS CONTROLLER FOR INTERACTING WITH THE HUB DEVICE, THE POWER CONSUMPTION PROFILE BASED, AT LEAST IN PART, ON THE MOTION SENSOR INFORMATION

504

CONTROLLING COMPONENTS OF THE WIRELESS CONTROLLER BASED ON THE POWER CONSUMPTION PROFILE

GAMING CONTROLLER POWER MANAGEMENT IN DYNAMIC GAMING ENVIRONMENT

FIELD OF THE DISCLOSURE

The instant disclosure relates to information handling system power management. More specifically, portions of this disclosure relate to a power saving mechanism for peripheral devices of an information handling system.

BACKGROUND

As the value and use of information increase, individuals and businesses seek additional ways to process and store information. One option available for such a purpose is the information handling system. An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. Variations in information handling system build and capabilities allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include computing devices that execute video game applications. For example, a desktop computer, a laptop computer, a tablet, a mobile device, a server, or a gaming console may execute a video game application. Video game applications include single-user video games and multi-user video games (e.g., where multiple players compete or cooperate with one another), as well as virtual reality (VR) video games, augmented reality (AR) video games, and other types of video games. During gameplay, a user may provide input to an information handling system via a user input device, such as a game controller.

SUMMARY

Some user input devices may include advanced features to simulate certain conditions associated with a virtual gaming environment. To provide a realistic user experience for certain games, such an input device may include relatively specialized circuitry to generate audio, visual, or haptic feedback that enhances game play for a user. However, the power consumption of a user input device with such advanced features can vary greatly based on the types of video games a user prefers to play. For example, a game controller operated by a user who prefers to play action and sports games may utilize advanced features (e.g., adaptive feedback controls, haptic vibration, or both) that consume more power than a controller operated by another user who plays puzzle games using only standard input buttons or other controls. Also, user habits, such as neglecting to power off the controller after a session of gameplay, can consume battery life without any actual gaming taking place. Accordingly, power intensive games and features along with a user's gaming habits and preferences can significantly affect a game controller's power consumption and battery lifetime.

In some embodiments, an information handling system (e.g., the hub device) and/or the wireless gaming controller may implement a smart power saving mechanism that automatically adjusts the power management settings of a user device, such as a game controller or other peripheral device, associated with a user to optimize battery life without sacrificing user's gaming experience. For example, the smart power saving mechanism may determine optimal power management settings that not only take into account the energy requirements or power consumption profile of the peripheral device and its components but also take into account a gaming profile of the user. In some implementations, the information handling system may store a user profile for the user, including usage data relating to a usage of the peripheral device by the user during one or more gaming sessions.

The usage data may include telemetry data collected by the information handling system to monitor the usage of the peripheral device by the user during execution of the gaming application. The telemetry data may include, for example, user input data, sensor data, and any other session data that may be available or obtained by the information handling system over one or more gaming sessions. The user input data may include a record of the user's inputs, including the particular input elements (e.g., buttons, triggers, thumbsticks, etc.) of the peripheral device used or operated by the user during the gaming session and the usage frequency for each element. The sensor data may include measurements collected by one or more sensors coupled to or integrated with the peripheral device. While the input data may indicate the user's particular input characteristics or preferences during gameplay, the sensor data may indicate the user's other gameplay characteristics (such as the degree and frequency of the user's motions or movements between different locations during a gaming session). Examples of such sensors include, but are not limited to, one or more motion sensors (e.g., a gyroscope or an accelerometer or both), a heart rate sensor, a temperature sensor, a moisture sensor, a microphone, and a fingerprint sensor (for user identification), and one or more location sensors. In some implementations, the location sensor(s) may include a global positioning system (GPS) for measuring an absolute or geographical location and/or a radio antenna for measuring a relative location of the user or user device (the peripheral device in this example) within a gaming environment, e.g., using radio frequency (RF) based geolocation.

The usage or telemetry data collected during each gaming session may be stored with the user profile associated with the user, e.g., in a user profile database coupled to the information handling system. The stored user profile data may provide a record of the user's gaming preferences and gameplay characteristics across different games played by the user. In some implementations, the user profile data may be analyzed by the information handling system to determine the user's preferred gaming experience for each type or genre of game the user plays. The gaming preferences and gameplay characteristics, which can be used to determine appropriate power management settings of the user device. For example, when the user begins a new gaming session, the user profile data associated with the user (e.g., based on usage or telemetry data collected over one or more previous gaming sessions) may be used by the information handling system to automatically initialize power management settings of the user device for the new session. The information handling system may also vary the initial power management settings based on a type or content of the gaming application, for example, by selectively enabling or disabling certain functions of the user device that are unlikely to be used to save power. This allows the initial power management settings of the user device to be optimized for a current gaming session based on the particular user profile (and known gaming characteristics or preferences of the user) and the particular content or type of the gaming application. By monitoring the usage of the user device during the new gaming session, one or more of the power management settings may be adjusted (and further optimized) based on a detected change in the usage (e.g., detecting a period of inactivity in which no user input is received for more than a maximum/threshold period of time). The monitored usage may also be used to determine additional gameplay characteristics of the user or changes/differences from the known characteristics/preferences, which may in turn be used to update the stored user profile data and further adjust the power management settings of the user device for subsequent gaming sessions.

In some aspects described herein may be used to support the execution of gaming applications in different environments. Gaming sessions may execute on a service, either locally on a device, on another system on the network, or in the cloud. A device may access the gaming session by executing an application that communicates with the service to receive and transmit user input to the service and provide feedback to the user from the service. The device may include its own audio/visual (AV) output for displaying a graphical user interface and/or a rendered display from the gaming session. Different environments at a location may include different AV systems, and the device may be automatically paired with an AV system and may be reconfigured to support interaction with an application session using the paired AV system.

A user's home is one example location that may have multiple environments, such as a living room, a dining room, a study, and/or a bedroom, each with different screen configurations, speaker configurations, and/or network availability. Aspects of embodiments disclosed herein may provide a system that enables game play from a set of candidate game hosts and environments to consumption devices of a user's choice while the user moves about their home between the different environments. The system may employ methods to determine where a user is located within the home, availability and selection of candidate game hosting and target environments, homing and direction of related I/O, and/or AV for consumption. The system then migrates the user and their information to the determined environment by coordinating gameplay by the user. The solution accommodates multiple users simultaneously within the home, whether in single player, multiplayer using the same screen, or multiplayer using separate screen games. The solution may configure AV and input/output (I/O) such that multiple users can consume one or multiple games in the home simultaneously, whether in separate locations or when seated together in front of the same consumption device, e.g., a large television, where multiple games might be hosted simultaneously.

The mobility of a user between services and applications for executing an application session may be supported by an information handling system that uses available telemetry from multiple sources to build a confidence-based knowledge graph of the user's gaming environments and determine a position of the user within that graph. A system with knowledge of devices in a user's gaming environment may build a knowledge graph by aggregating and comparing telemetry. For example, network telemetry may reveal that devices are positioned relatively near each other, a mobile device may reveal an absolute location based on GPS data, and/or an infrared presence sensor may reveal that the user is sitting in front a device. An intelligent system may assemble these individual pieces of telemetry into a broader knowledge graph based on the absolute and/or relative locations of the user's devices, the location of the user in relation, and or characteristics of the devices. This knowledge graph may be updated in real time and/or based on changes in device telemetry.

Information handling systems may be used to execute applications such as gaming applications. Embodiments of this disclosure may be used to provide an information handling system, such as a hub device, which manages the power consumption of user devices (such as wireless game controllers or other peripheral devices) that are communicatively coupled to or paired with the information handling system during the execution of a gaming application. The gaming application may be any of various types of single-player or multi-player gaming applications that may be executed by the information handling system. Examples of such gaming applications include, but are not limited to, puzzle games, role playing games, adventure games, first person shooter games, sports games, simulation games, strategy games, platformer games, and other games. The information handling system may host application sessions (or gaming sessions) for such games to support different types of gameplay in one or more gaming environments, such as one or more rooms of a user's home or a cloud-based gaming environment for online gameplay.

According to one embodiment, a method for controlling power consumption of a wireless controller comprises receiving motion sensor information from at least one motion sensor of a wireless controller associated with a hub device; determining a power consumption profile for the wireless controller for interacting with the hub device, the power consumption profile based, at least in part, on the motion sensor information; and controlling components of the wireless controller based on the power consumption profile for interacting with the hub device.

The method may be embedded in a computer-readable medium as computer program code comprising instructions that cause at least one processor to perform operations corresponding to the steps of the method. In some embodiments, the at least one processor may be part of an information handling system including a first network adaptor configured to transmit data over a first network connection, with the processor coupled to the first network adaptor, and a memory that stores the computer program code.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or." To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

6

FIG. 5 is a flow chart of an example method for adjusting power management settings of a peripheral device associated with a user of a gaming application based on user profile data and a usage of the peripheral device by the user during execution of the gaming application according to some embodiments of the disclosure.

Figure 6:
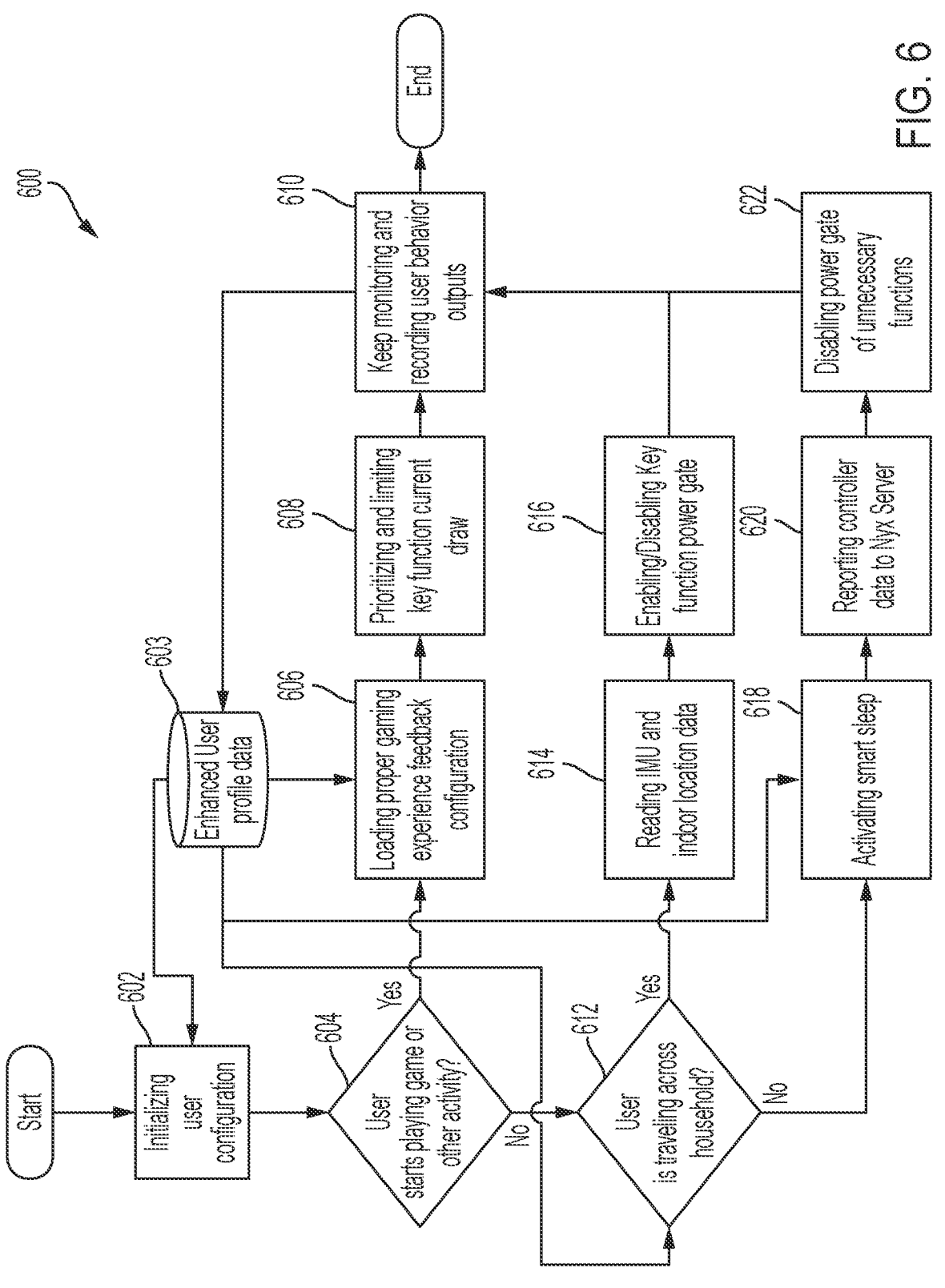

FIG. 6 is a flow chart of an example method for adjusting power management settings of a peripheral device associated with a user of a gaming application based on user profile data and a usage of the peripheral device by the user during execution of the gaming application according to some embodiments of the disclosure.

Figure 7:
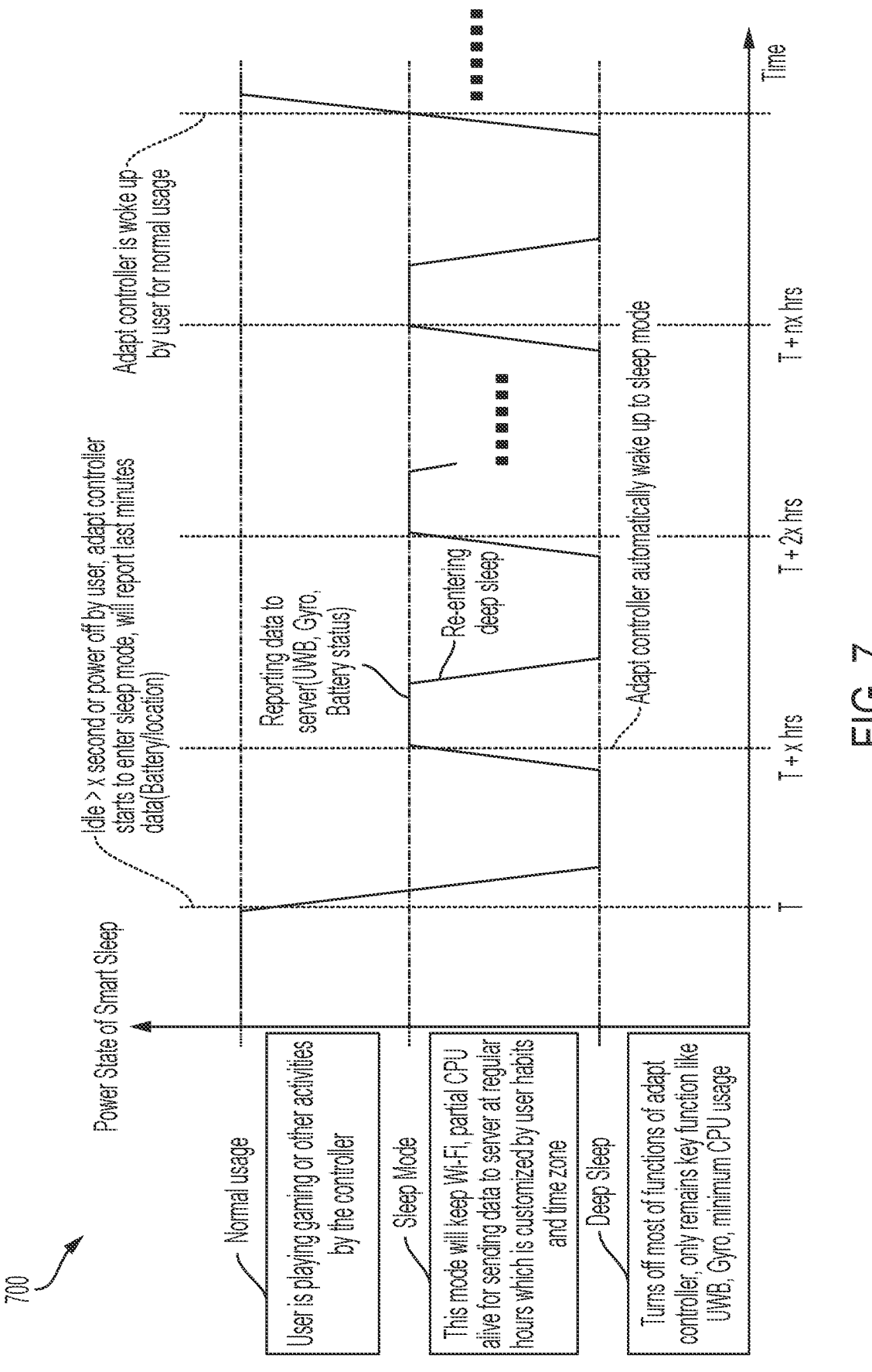

FIG. 7 is a chart illustrating an example operation of a wireless controller with different power state changes over time according to some embodiments of the disclosure.

Figure 8:
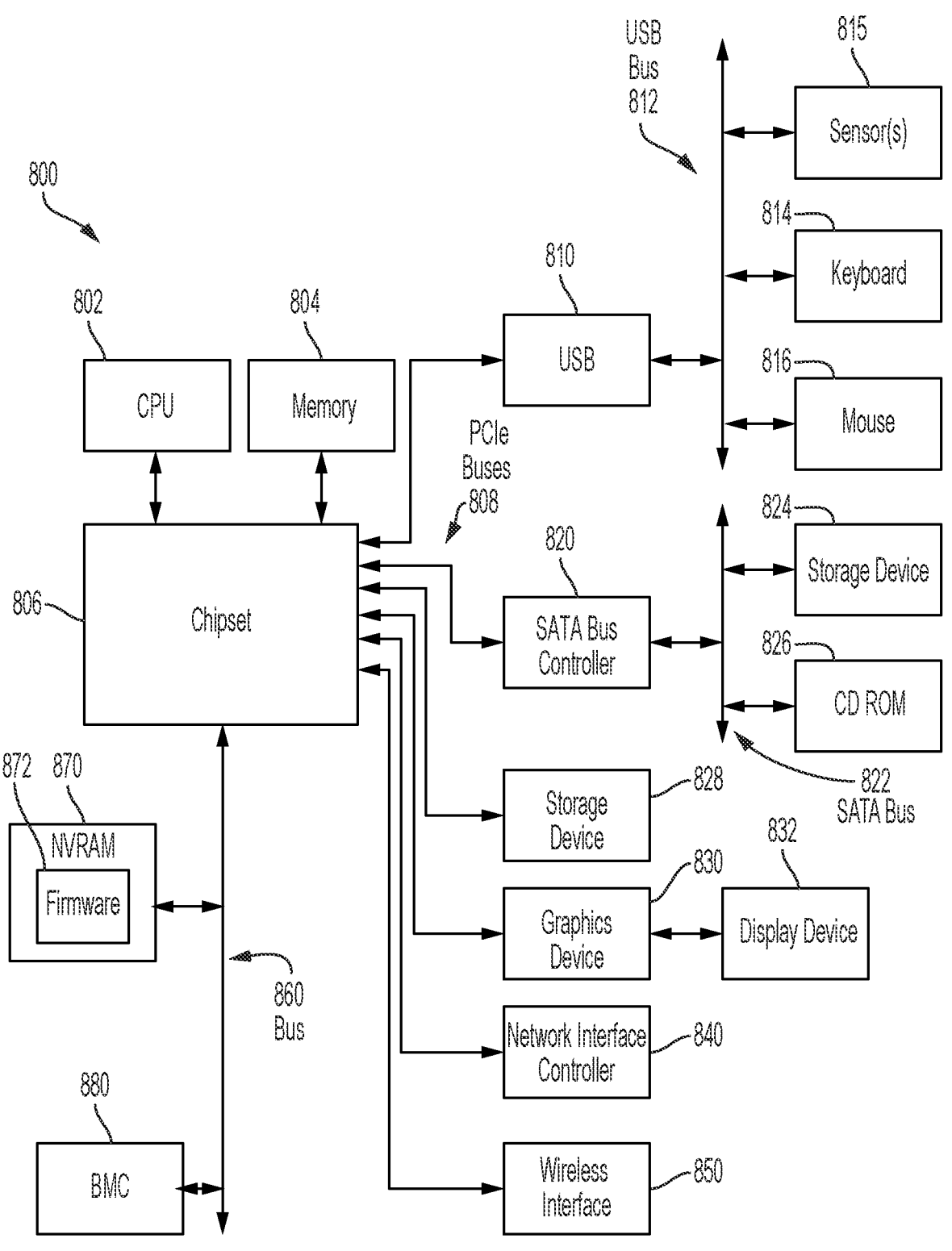

FIG. 8 is a block diagram of an example information handling system according to some embodiments of the disclosure.

DETAILED DESCRIPTION

The various embodiments of the present disclosure will be described in the context of one or more configurable and dynamic gaming environments that can be supported through the use of an information handling system, such as a hub device. The hub device may be located in a user's home and used to arrange game play sessions (or more generically application sessions) between host devices and services. The host devices may execute an application for receiving an AV stream for displaying rendered content from a game play session (or other application session), and in some configurations also receive user input for interacting with the session from a peripheral device, such as a gaming controller. The AV stream presented by the host device may be generated by a service. The service may execute on the hub device or another information handling system, such as a cloud computing resource. A home may include one or several host devices (e.g., televisions, mobile computers, tablet computers, and personal computers) and may include one or several information handling systems executing the service (e.g., a hub devices and personal computers).

The user's home may be divided into different environments defined by a space around a host device. For example, a living room with a television may be one environment and a bedroom with a personal computer may be another environment. A user may use a peripheral device in one of the environments and the hub device may configure a host device, a service, and the peripheral device for operation in the environment by determining the corresponding environment using a knowledge graph. The knowledge graph provides a database of historical information about the environments from which the hub device may use current characteristics of the peripheral device to deduce the location, and thus current environment, of the peripheral device. For example, the knowledge graph may include information about location of rooms (e.g., environments) in the house based on wireless signatures of devices within the different rooms. This difference in signatures reflects that a device on a one side of the house may receive beacon signals from different neighboring access points than a device on an opposite side of the house. When a user carries the peripheral device around the house, the hub device may determine a location of the peripheral device based on visible access points to the peripheral device. Other example characteristics beyond wireless signature for determining location are described in further detail below, and the knowledge graph may be used to combine different characteristics to identify the location, and thus environment, of the peripheral device.

Based on the location of the peripheral device determined from the knowledge graph, the hub device may initialize an application session for the peripheral device by determining an appropriate host device and service for the application session. For example, if the peripheral device is in the living room and is requesting a game that is within the capabilities of the service on the hub device to execute, the hub device may initialize an application session for the peripheral device between the television as a consumption device and the hub device as a service. The service on the hub device executes the game and streams rendered content to an application executing on the television consumption device.

The hub device may be used to migrate the peripheral device to a different environment and/or migrate the application session between host devices and/or services. For example, initially the application session may use a communication link between the peripheral device and the television host device for receiving user input, in which the application executing on the television host device relays user input to the service through a backhaul communication link from the television host device to the hub device. During the application session, the hub device may monitor characteristics of the peripheral device, including signal strength of connection to other components, and determine that the communication link from the peripheral device to the hub device is stronger than the peripheral device to the television host device. The hub device may migrate the peripheral device to a communications link with the hub device such that the service executing on the hub device directly receives the user input but the streaming session continues from the service to the application executing on the television host device. Such a change is illustrated in the change in configuration from FIG. 3A to the configuration of FIG. 3B described in further detail below.

Other aspects of the application session may also be migrated. For example, if the peripheral device is determined to move to a different environment, then the hub device may migrate the application session to an application executing on a host device within the new environment. As another example, if a connection between the television host device and the service becomes unstable, the hub device may recommend and/or initiate a migration of the application session to a different host device. One scenario for such a migration may be where the television host device is connected through a wireless link to the service in which the wireless link quality is reducing quality of the streaming and a second host device with a wired connection is available in a nearby environment. Each of these example migrations may be determined based on information in the knowledge graph regarding locations of environments and capabilities within those environments. As yet another example, a user may request execution of an application, such as a particular game, during the application session for which a better configuration exists than the current host device and/or current service. The request for a different application, such as a game requiring a certain GPU capability, may cause the hub device to determine that a second device executing a second service is better for hosting the application and migrate the peripheral device to the second service by, for example, reconfiguring network connections.

The hub device may support connecting to multiple peripheral devices. In one example, the hub device may support two peripheral devices using a shared session on one host device to play the same or different games on the host device. In another example, the hub device may support two peripheral devices in different environments using different sessions with different host devices. The hub device may determine the environment of each of the peripheral devices based on characteristics of the device and the knowledge graph and configure application session for each of the peripheral devices accordingly. Different arrangements of peripherals and players may be supported. For example, one hub device executing a service and one host device executing an application can support a configuration with Game A and one player (P1) with peripheral (C1) and Game B and one player (P2) with peripheral (C2); or can support a configuration with Game A and one player (P1) with peripheral (C1) and Game A and one player (P2) with peripheral (C2); or can support a configuration with Game A and two players (P1, P2) with peripherals (C1, C2).

For purposes of this disclosure, an information handling system or hub device may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, handheld gaming system, console gaming system, hybrid gaming system, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
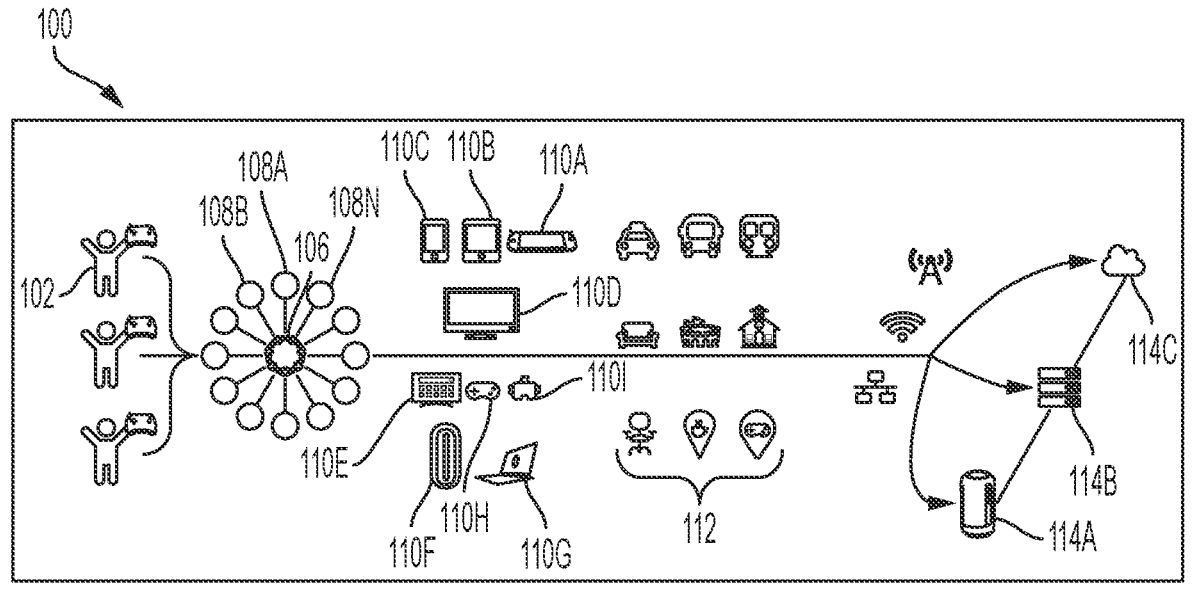
FIG. 1 is a block diagram illustrating aspects of a configurable system for providing various services to users according to some embodiments of the disclosure.

FIG. 1 is a block diagram illustrating aspects of a configurable system for providing services to users according some embodiments of the disclosure. A system 100 includes users 102 who may have access to a shared library of applications 106 including applications 108A-108N. The users 102 may have separate libraries, with some overlapping applications between the libraries. The users 102 may access the library 106 through devices 110A-I, such as mobile gaming device 110A, tablet computing device 110B, phone computing device 110C, television 110D, personal computing device 110E, desktop computing device 110F, laptop computing device 110G, game controller 110H, VR headset 110I. The devices 110 may access services at any of locations 112, including cars, busses, homes, hotels, offices, parks, etc. One or more of the devices 110 may communicate with an application session executing on a computing device 114, such as a home application hub 114A, a server 114B, or a cloud execution environment 114C. In some embodiments, environments may only exist for fixed devices, e.g., desktop computers, televisions, etc.

In some implementations, an application session, such as a gaming session of a gaming application, may execute on a service, either locally on a device, on another system on a network, or in the cloud. A device, such as one of devices 110A-I, may access the application session by executing an application that communicates with the service to receive and transmit user input to the service and provide feedback to the user from the service. It is noted that a portion (or entirety) of an application session for a gaming application accessed by a device associated with a user may be referred to as "a user session." The gaming application may be, for example, any of various single-player or multi-player games. Examples of such gaming applications include, but are not limited to, puzzle games, role playing games, adventure games, first person shooter games, sports games, simulation games, strategy games, platformer games, and any other games. The device may include its own audio/visual (AV) output for displaying a graphical user interface and/or a rendered display from the application session. Different environments at a location may include different AV systems, and the device may be automatically paired with an AV system and may be reconfigured to support interaction with an application session using the paired AV system.

Figure 2:
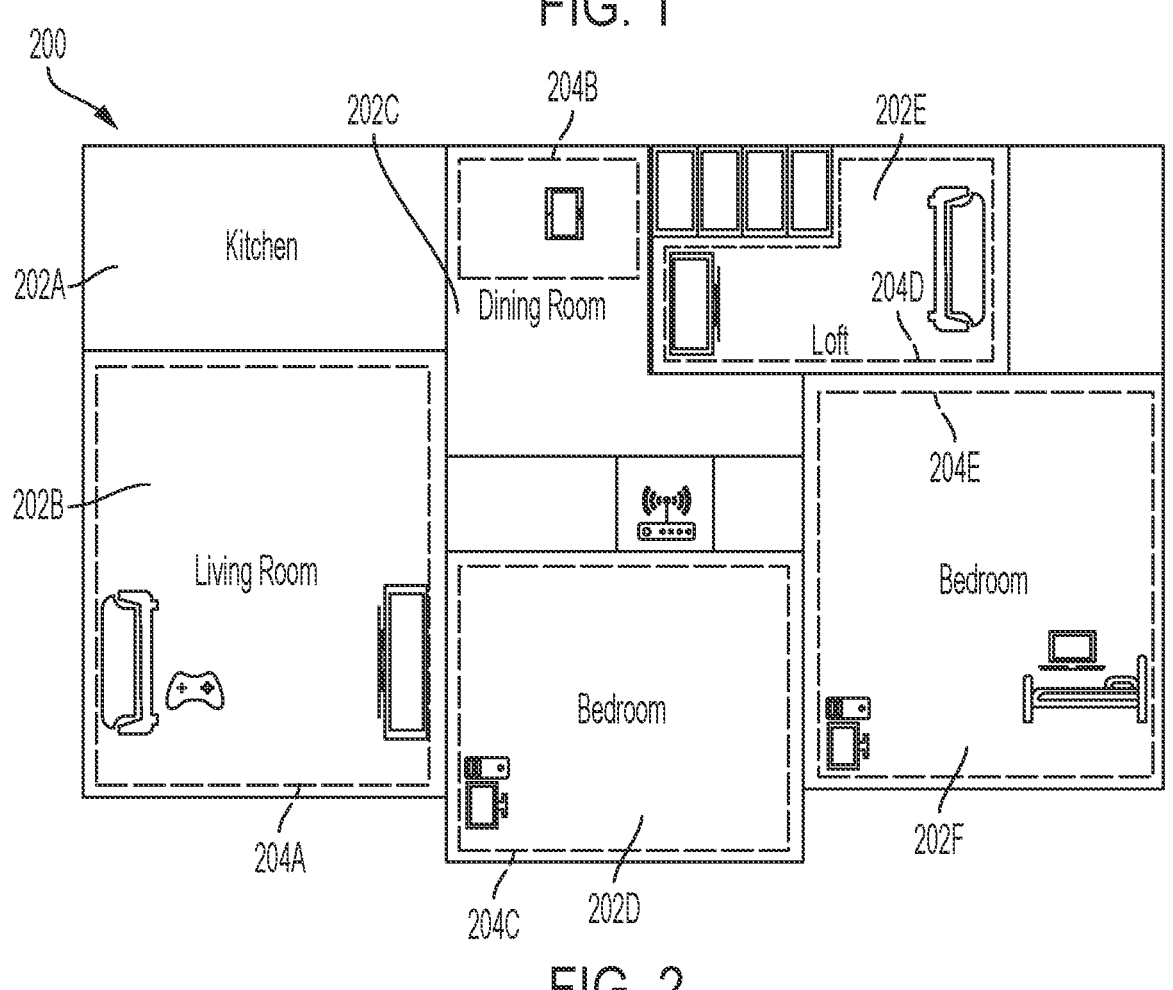
FIG. 2 is a block diagram illustrating possible gaming environments according to some embodiments of the disclosure.

FIG. 2 is a block diagram illustrating possible game environments according to some embodiments of the disclosure. A user's home 200 may include rooms 202A-F, and each of the rooms may have different information handling systems present, different AV equipment present, and/or different characteristics. For example, a living room 202B may include a large-size television, a bedroom 202D may include a personal computer, and a dining room 202C may include a table computing device. Gaming environments 204A-E in the home 200 may be defined based on spaces where a user is likely to execute an application session. Each gaming environment 204A-E may include numerous devices and gaming environments, devices that may or may not be capable of hosting games, and/or devices that may or may not be capable of receiving game output. A system 100 may allow multiple users in the home 200 to simultaneously execute an application session (e.g., a user session associated with each user). In some embodiments, multiple games may be hosted on a single device. In some embodiments, multiple games may target a single output device. In some embodiments, solution manages where games should be hosted, where game output should go, and how to best route peripheral I/O for users.

A user may move between gaming environments 204A-E within the home 200 and continue an application session. For example, a user may take a device, such as a gaming controller, from environment 204A to environment 204C. The gaming controller may migrate and reconfigure for operation in environment 204C from a configuration for environment 204A. For example, the controller may transition from an application hosted on a TV in living room 202B to an application hosted on TV in dining room 202C while remaining connected to a host service executing on a PC in bedroom 202D.

Figure 3A:
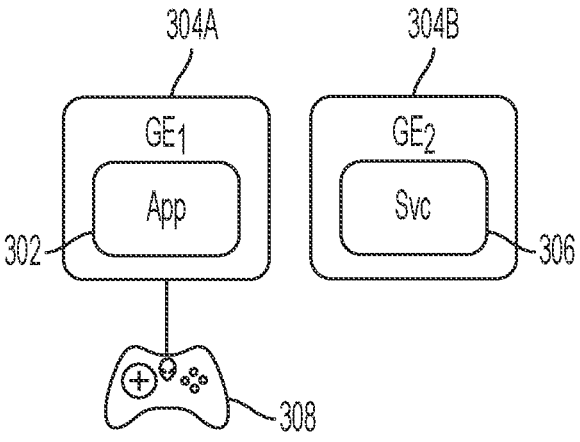
FIG. 3A is a block diagram illustrating an arrangement of applications and services hosted in different gaming environments according to some embodiments of the disclosure.

Example configurations for applications and services in gaming environments are shown in FIGS. 3A-3D. FIG. 3A is a block diagram illustrating application and services hosted in different gaming environments according to some embodiments of the disclosure. In FIG. 3A, a first gaming environment 304A may include a device, such as a TV or PC, hosting an application 302, which is an endpoint for an application session, such as a gaming session. The application 302 communicates with a service 306, which may be hosted on a device in a different gaming environment 304B. A controller 308 may communicate with the application 302 to receive user input for the application session to control, for example, a character in a game. In some embodiments, the controller 308 is connected to the environment 304A hosting the application and the I/O is configured to be relayed to the environment 304B hosting the actual game.

Figure 3B:
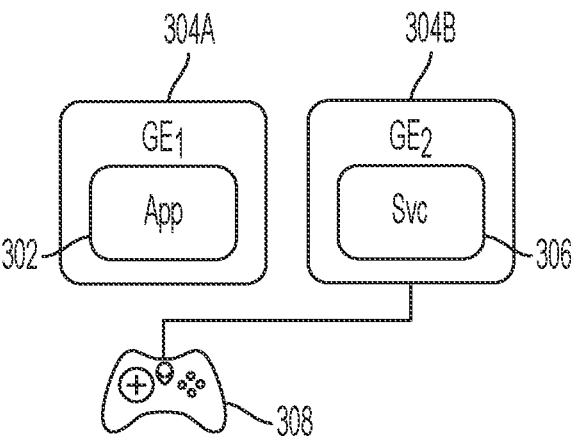
FIG. 3B is a block diagram illustrating another arrangement of applications and services hosted in different gaming environments according to some embodiments of the disclosure.

Another arrangement for the application and service is shown in FIG. 3B. FIG. 3B is a block diagram illustrating application and services hosted in different gaming environments according to some embodiments of the disclosure. In FIG. 3B, the controller 308 communicates with the service 306 for providing user input to an application session, with the AV rendering target of the application session being application 302 in a different gaming environment.

Figure 3C:
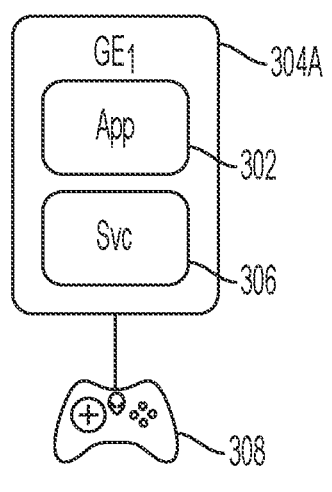
FIG. 3C is a block diagram illustrating an arrangement of applications and services hosted in a common gaming environment according to some embodiments of the disclosure.

Another arrangement for the application and service is shown in FIG. 3C. FIG. 3C is a block diagram illustrating application and service hosted in a common gaming environment according to some embodiments of the disclosure. In FIG. 3C, the application 302 and the service 306 are executed in the same gaming environment 304A, which may be a single device, two devices, or a combination of devices in the gaming environment 304A. The controller 308 may communicate with either the service 306 and/or the application 302 via a wired or wireless connection to the hub device (or a corresponding host device configured by the hub device).

Figure 3D:
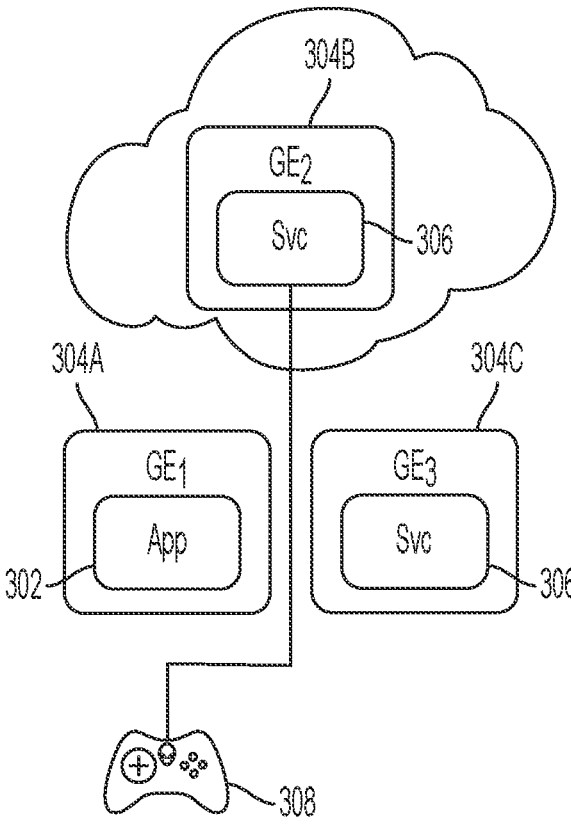
FIG. 3D is a block diagram illustrating a cloud-based service arrangement of a gaming environment according to some embodiments of the disclosure.

A further arrangement for the application and service is shown in FIG. 3D. FIG. 3D is a block diagram illustrating a cloud-based service arrangement for a gaming environment according to some embodiments of the disclosure. In FIG. 3D, the controller 308 may communicate with a service 306 hosted in a gaming environment 304B that is remote from the gaming environment 304A in which the application 302 is executing. The service 306 may be executing, for example, on a remote device, even though the user's home includes a gaming environment 304C in which the service 306 may be executed, when the user is engaging with the application 302 at a location on a different network from their home (e.g., at a friend's house). The service 306 may also or alternatively be executed, for example, on a cloud computing device available as a subscription service to the user.

In some embodiments, the service 306 may be used to implement a smart power saving mechanism that manages the power consumption of a user device associated with a user of one or more gaming applications based on user profile data and a usage of the device by the user. The user device may be, for example, a peripheral device (such as the controller 308 or other input device) communicatively coupled to or paired with an information handling system or hub device that executes the service 306 (and associated smart power saving features) alongside each gaming application. The information handling system may store a user profile for the user with data collected from the user device while monitoring a usage of the device by the user during execution of each gaming application. The user profile data stored for the user may indicate, for example, the user's gaming preferences and/or gameplay characteristics (including any gaming habits or behaviors that are unique to the user).

As will be described in further detail below, the user profile data associated with the user (e.g., as collected during one or more previous gaming sessions) along with information pertaining to the gaming genre or type of content associated with a gaming application may be used to initialize power management settings of the user device for a current gaming session of the gaming application. One or more of the power management settings may then be adjusted based on the monitored usage of the user device (e.g., based on usage data collected by the information handling system) during the current gaming session.

Accordingly, the disclosed power saving techniques allow the power management settings of a user device to be appropriately adjusted before a user session of a gaming application (e.g., based on the features of the user device expected to be utilized by the user for that type of application) and during the user session (e.g., based on the features of the user device that are actually utilized by the user).

In one embodiment, power management of the gaming controller may be controlled by the hub device. For example, the hub device may receive information from the wireless controller such as motion sensor information. The hub device may use the motion sensor information in addition to context information on the hub device, such as applications executing on the hub device that are interacting with the gaming controller. The hub device may then send instructions to the controller for changing settings on the gaming controller that adjust the power consumption, such as by changing modes or disabling certain components within the gaming controller. Embodiments of a hub device-controlled power management scheme are described with reference to FIG. 4 below. However, other embodiments of the disclosure may include power management operations performed by a combination of the gaming controller and the hub device, or by the gaming controller alone.

Figure 4:
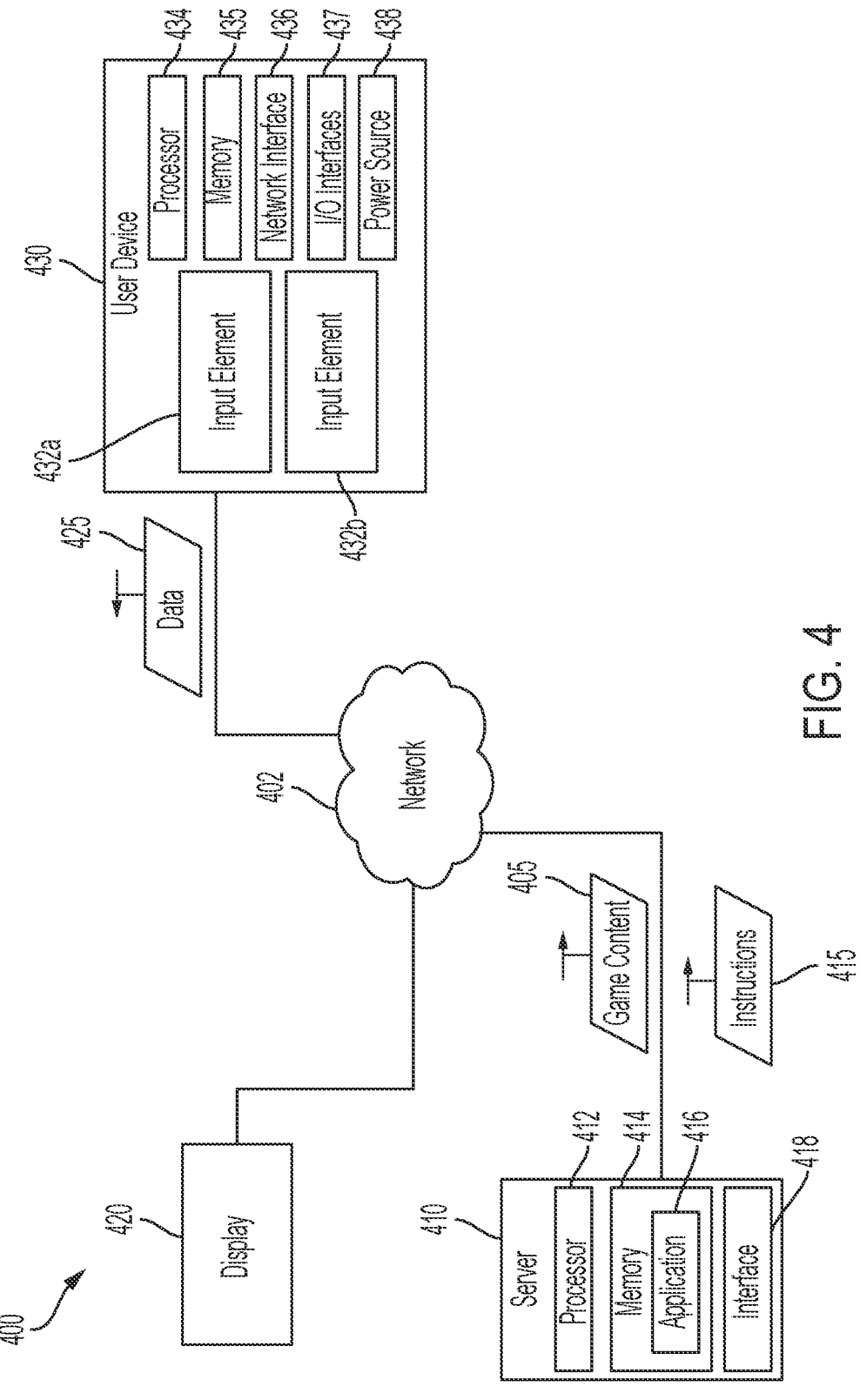
FIG. 4 is a block diagram of an example system for adjusting power management settings of a user device, such as a game controller or other peripheral device associated with a user, based on user profile data and a usage of the device by the user during execution of a gaming application according to some embodiments of the disclosure.

FIG. 4 is a block diagram of an example system 400 for adjusting power management settings of a user device associated with a user of a gaming application based on user profile data and a usage of the user device by the user during execution of a gaming application according to some embodiments of the disclosure. System 400 may include or correspond to one or more devices in system 100 of FIG. 1, as described above.

As shown in FIG. 4, system 400 includes a server 410, a display 420, and a user device 430. The server 410, display 420, and user device 430 may be communicatively coupled to one another via a network 402. The network 402 may include a wired network, a wireless network, or a combination thereof. To illustrate, the network 402 may include a Bluetooth personal area network (PAN), a local area network (LAN), a wireless LAN (WLAN), a wide area network (WAN), a wireless network (e.g., a cellular network), a wired network, the Internet, one or more other networks, or a combination thereof, as illustrative, non-limiting examples. In some implementations, the network 402 may include or correspond to a wired or wireless connection between the server 410 and each of the display 420 and the user device 430.

The server 410 may include a processor 412, a memory 414, and an interface 418. Although not shown in FIG. 4, it should be appreciated that the server 410 may include any number of additional components as needed or desired for a particular implementation. The processor 412, memory 414, interface 418 and other components of server 410 may be coupled to each other via an internal data bus of the server 410. The processor 412 may be a central processing unit (CPU) or other computing circuitry (e.g., a microcontroller, one or more ASICs, or the like) having one or more processing cores. The memory 414 may include a read only memory (ROM) device, a random access memory (RAM) device, one or more hard disk drives (HDDs), a flash memory device, a solid state drive (SSD), or any other computer-readable storage media used to store data in a persistent or non-persistent state. The interface 418 may be, for example, a network interface for communicating with the display 420, the user device 430, and other devices (not shown) over network 402.

The memory 414 may be used to store instructions or code executable by the processor 412, including instructions or code for an application 416. Although only application 416 is shown in FIG. 4, it should be appreciated that the memory 414 may be used to store instructions or code for any number of applications or services executed or hosted by the server 410. To illustrate, the memory 414 may store instructions that, when executed by the processor 412 of the server 410, cause the processor 412 to perform operations relating to a service for performing operations relating to the smart power saving techniques disclosed herein. For example, such a smart power saving service may be executed by the server 410 alongside the application 416 to automatically adjust the power management settings of the user device 430 based on a content of the application 416 and a profile of the user associated with the user device 430, as will be described in further detail below.

It should also be appreciated that the memory 414 may be used to store different types of data, including data associated with the application 416 and the smart power saving service described above. Such data may include, for example, one or more thresholds, user preferences, configuration settings for the display 420 and/or the user device 430, and other relevant data associated with one or more users and their respective user devices (such as the user device 430). In some implementations, the memory 414 may be used to store device metadata identifying the display 420, the user device 430, and other devices associated with one or more application or gaming environments (such as gaming environments 204A-E of FIG. 2, gaming environments 304A-C of FIGS. 3A-3D, or a combination thereof). The gaming environments may correspond to different rooms of a user's home (such as rooms 202A-F of the user's home 200 shown in FIG. 2, as described above). The device metadata may include, for example, a unique device identifier, a device type, a device manufacturer, a device model, or any combination thereof. In some embodiments, the memory 414 may also be used to store power management settings for different operating modes or power states associated with the user device 430 (and other user devices).

In some implementations, system 400 may be a gaming system in which the server 410 may include or correspond to an information handling system or hub device, such as a gaming console, a desktop computer, a laptop computer, a tablet, a mobile device, a cloud server, or other type of computing device. Accordingly, the application 416 may be any of various single-player or multi-player games executed by the information handling system. For example, the information handling system may provide (e.g., via the interface 418 of the server 410) access to a shared library of gaming applications (e.g., the library 106 of FIG. 1, as described above), including the application 416. Individual games within the library may be accessible and playable by various users who have user accounts or profiles registered with the server 410 via their respective user devices (such as the user device 430) from the one or more gaming environments described above.

In some embodiments, the display 420 may be a display device (or "gaming display") paired with the server 410 for rendering game content 405 received from the server 410 via the network 402. The display device may be, for example, a computer monitor or a television (e.g., a smart television with computing or processing circuitry, a memory, and a network interface for communicating with the server 410 and/or the user device 430 via the network 402). The game content 405 may include, for example, text, video, audio, and graphics content produced by the application 416 as it is executed by the server 410. In some implementations, the server 410 executing the application 416 or other applications may be integrated with the display 420. Additionally or alternatively, the server 410 and the display 420 may be integrated with the user device 430, e.g., as part of a mobile computing system or handheld gaming device.

In some embodiments, the user device 430 may be a peripheral device coupled to the server 410 via the network 402. Examples of such a peripheral device include, but are not limited to, a wired or wireless game controller (e.g., a gamepad or a joystick controller), a mouse, a keyboard, a headset, a virtual reality (VR) device, an augmented reality (AR) device, a vehicle control simulation device (such as a racing wheel or a vehicle pedal assembly), a musical instrument simulation device (such as a guitar controller), a detachable controller, or a brain-computer interface (BCI) device, a streaming device (e.g., for streaming gaming content 405 from the server 410), a handheld gaming device, a smartphone, and a tablet computer. In some implementations, the network 402 may include or correspond to a wired or wireless connection between the server 410 and the user device 430.

As shown in FIG. 4, the user device 430 may include an input element 432a, an input element 432b, a processor 434, a memory 435, a network interface 436, input-output (I/O) interfaces 437, and a power source 438. It should be appreciated that the user device 430 may include more or fewer components than those shown in FIG. 4 as desired for a particular implementation. Each of the input elements 432a and 432b may include or correspond to any of various input controls or control elements. Examples of such input controls or elements include, but are not limited to, buttons, thumbsticks, triggers, touchpads, touchscreens, directional pads, scroll wheels, microphones, and other types of physical or virtual input components that allow a user to initiate an application session (e.g., a gaming session) of the application 416 and input commands or interact with the application 416 (e.g., with characters or items within the game during the gaming session).

The processor 434 may be a central processing unit (CPU) or other computing circuitry (e.g., a microcontroller, one or more application specific integrated circuits (ASICs), or the like) and may have one or more processing cores. The processor 434 may be a CPU or other computing circuitry (e.g., a microcontroller, one or more ASICs, or the like) having one or more processing cores. The memory 435 may include a ROM device, a RAM device, one or more hard disk drives, a flash memory device, a solid state drives, or any other device or combination of different devices configured to store instructions or code and data in a persistent or non-persistent state. For example, the memory 435 may store instructions 415 received from the server 410 via the network 402. The instructions 415, when executed by the processor 434, may cause the processor 434 to perform operations. Such operations may include, for example, operations for transitioning between different operating modes corresponding to different power states of the user device 430 in connection with the smart power saving service provided for the user device 430. Additionally, the memory 435 may store one or more profiles, thresholds, data, preferences, or other settings. Such settings may include, for example, power management settings configured by the processor 434 according to the instructions 415 received from the server 410 (and/or stored in the memory 435). For example, the instructions 415 may be sent by the server 410 as part of the operations performed in connection with the smart power saving service for managing the power consumption of the user device 430. In some implementations, the instructions 415 may include one or more control signals for controlling components of the user device 430 (e.g., a wireless controller) based on a power consumption profile determined for the user device 430, as will be described in further detail below.

The memory 435 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. The memory 435 may store instructions that, when executed by the processor 434, cause the processor 434 to perform the operations in connection with the disclosed power saving techniques. Additionally, the memory 435 may store one or more profiles, thresholds, data, preferences, or other settings (e.g., power management settings for different operating modes of the user device 430).

The interface 436 may be configured to enable wireless communication between the user device 430 and the server 410 via the network 402. In some implementations, the interface 436 may include a long range (LoRa) interface, a Wi-Fi interface (e.g., an Institute of Electrical and Electronics Engineers (IEEE) 802.11 interface), a cellular interface (e.g., a fourth generation (4G) or long term evolution (LTE) interface, a fifth generation (5G) new radio (NR) interface, or the like), a Bluetooth interface, a Bluetooth low energy (BLE) interface, a Zigbee interface, another type of network interface, or the like.

The I/O interfaces 437 of the user device 430 may include various input interfaces corresponding to the input elements 432a and 432b. Additionally, the I/O interfaces 437 may include one or more output interfaces to generate one or more outputs via corresponding output devices or components of the user device 430.

In some implementations, the user device 430 may further include one or more sensors, such as motion sensors (e.g., accelerometers and/or gyroscopes), location sensors, fingerprint sensors, (e.g., one or more of a global positioning system (GPS) for measuring geographical location or an antenna for measuring relative location using signal propagation across one or more frequency bands)

In addition to various input interfaces corresponding to the input elements 432a and 432b described above, the I/O interfaces 437 of the user device 430 may include one or more output interfaces to provide one or more outputs for the user via corresponding output devices coupled to or integrated with the user device 410 and/or the user device 420, based on the output data 435 received from the server 430. The output(s) may include, for example, audio output via one or more speakers, visual output via a display, lighting output via one or more light sources (e.g., a light ring), haptic output via one or more haptic or vibration devices (e.g., haptic feedback via a haptic touchpad or a rumble motor), or any combination of the foregoing.

In some embodiments, a user profile may be stored for each user associated with a gaming environment (e.g., each family member or gamer who resides in the user's home). The user profile or account associated with each user may include, for example, the user's age, gender, and other relevant data about the user. In some implementations, the user profile for each user may be stored within a local or remote (e.g., cloud-based) database (not shown) accessible to the server 410 (e.g., via the network 402).

In some embodiments, the user profile stored for each user may include data pertaining to the user's gaming preferences and gameplay characteristics or habits. Such user profile data may be based on usage data collected by the server 410 to monitor a usage of the user device 430 during the execution of the application 416 (e.g., over one or more application sessions or gaming sessions initiated by the user via the user device 430).

The display 420 may be a display device paired with the server 410 for rendering game content 405 produced by the application 416 during a gaming session. In some implementations, the display 420 may output its own audio/visual (AV) content, which may be displayed via a graphical user interface before, during or after the gaming session.

In some implementations, server 430 may be used to host an application session (e.g., a gaming session) for the gaming application 432. In some implementations, the server 430 may operate as a gaming cloud server that provides a cloud-based execution environment for gaming applications, such as the gaming application 432, of the gaming system.

FIG. 5 is a flow chart of an example method 500 for adjusting power management settings of a peripheral device associated with a user of a gaming application based on user profile data and a usage of the peripheral device by the user during execution of the gaming application according to some embodiments of the disclosure. Method 500 begins at block 502, which includes receiving motion sensor information from at least one motion sensor of a wireless controller associated with a hub device.

At block 504, a power consumption profile is determined for the wireless controller for interacting with the hub device based, at least in part, on the motion sensor information received at block 502. For example, the motion sensor information may be used at block 504 to determine whether the wireless controller is providing user input to an application (e.g., a gaming application or game) executing on the hub device. When the wireless controller is providing user input to the application, the power consumption profile may be determined to be a first profile. Conversely, when the wireless controller is not providing user input to the application, the power consumption profile may be determined to be a second profile.

Method 500 then proceeds to block 506, which includes controlling components of the wireless controller based on the power consumption profile (e.g., the first profile or the second profile) determined at block 504. Controlling components of the wireless controller may include, for example, managing operating modes of the components, disabling certain components, and changing how the controller interacts with the hub device, such as changing a frequency of communication with the hub device and what data is communicated with the hub device.

In some embodiments, the first profile for controlling components of the wireless controller may be determined based on the application executing on the hub device. In some implementations, the operations for determining the first profile at block 504 of method 500 described above may include determining a first subset of components in the wireless controller for controlling in a first power state and determining a second subset of components in the wireless controller for controlling in a second power state. For example, when the application corresponds to a first category of gaming applications (e.g., shooting games), the first subset of components may include adaptive input controls and the second subset of components may include rumble motors. Likewise, when the application corresponds to a second category of gaming applications (e.g., fighting games), the first subset of components may include rumble motors and the second subset of components may include adaptive input controls.

In some embodiments, the second profile for controlling components of the wireless controller may be based on a motion level of the wireless controller determined from the motion sensor information received at block 502. For example, when the motion level satisfies a first criterion, the second profile of the wireless controller may correspond to a first sleep state. In the first sleep state, certain components of the wireless controller may be deactivated, such as components other than a location determination circuit and the at least one motion sensor. In another example, the motion level of the wireless controller may satisfy a second criterion. The second profile in this example may correspond to a second sleep state with lower power consumption than the first sleep state. In the second sleep state, for example, components of the wireless controller other than a timer circuit may be deactivated.

FIG. 6 is a flow chart of an example method 600 for adjusting power management settings of a peripheral device associated with a user of a gaming application based on user profile data and a usage of the peripheral device by the user during execution of the gaming application according to some embodiments of the disclosure. Method 600 begins at block 602, which includes initializing a user configuration for a wireless controller associated with a hub device executing the gaming application. The initial configuration may be based on user profile data received at block 603 for a user of the wireless controller. In some implementations, the user profile data may be enhanced with telemetry information relating to gaming preferences and/or gameplay characteristics of the user. Such telemetry information may be collected for the user over one or more application sessions (or gaming sessions) of the gaming application.

Method 600 may then proceed to block 604, which includes determining whether the user is actively playing the game after starting a new gaming session. The determination at block 604 may be based on, for example, motion information received from one or more motion sensors that are coupled to or integrated with the wireless controller. Based on the motion sensor information, it may be determined whether the wireless controller is providing user input to the application executing on the hub device. If it is determined at block 604 that the user is playing the game (e.g., when the controller is providing user input to the application), method 600 proceeds to block 606, which includes loading a gaming experience suitable to the user's gaming preferences and/or gameplay characteristics based on the initial user configuration from block 602 and/or user profile data from block 603. In some embodiments, block 606 may include loading a power consumption profile for the wireless controller that reflects the user's gaming preferences (or category of games the user prefers to play) and the power consumption requirements associated such games. For example, the user profile data received at block 603 may indicate that the user prefers to play shooting games, which generally require more trigger feedback and less haptic vibration, or fighting games, which require more haptic vibration and less trigger feedback.

At block 608, method 600 may include prioritizing and limiting the current draw for certain key functions of the wireless controller, based on the user's preferred gaming experience. This may include, for example, controlling various components of the wireless controller by managing operating modes of the components, disabling certain components, and changing how the controller interacts with the hub device, such as changing a frequency of communication with the hub device and what data is communicated with the hub device, as described above. At block 610, the user's gaming behavior may be continuously monitored and recorded to adjust the power consumption profile of the wireless controller accordingly.

Returning to block 604, if it is determined that the user is not playing the game (e.g., when the wireless controller is not providing user input to the application during the gaming session) and thus, performing some other activity, method 600 may proceed to block 612. Block 612 includes determining whether the user is traveling or moving between different gaming environments (e.g., different rooms across the user's household). The determination at block 612 may be based on the motion sensor information received from at least one motion sensor of the wireless controller, as described above. The motion sensor information may include, for example, indoor location data (such as time-series data) captured by an inertial measurement unit (IMU) or at least one motion sensor (e.g., an accelerometer and/or gyroscope) coupled to or integrated with the wireless controller. If the user is moving or traveling across the household (and thus, not playing the game), method 600 proceeds to block 614, which includes reading or accessing the indoor location data from the IMU or motion sensor(s) of the wireless controller. The location data may then be used at block 616 to determine which key functions and corresponding power gates of components in the wireless controller to enable or disable to place the controller in a sleep state for power saving. Following block 616, method 600 may again proceed to block 610 to continue monitoring and recording the user's gaming behavior.

Returning to block 612, if it is determined from the motion information that the user is not moving or traveling between different gaming environments (e.g., across the household), it may be assumed that the user is taking a break from the gameplay and method 600 may proceed to block 618 for activating smart sleep for the wireless controller. In some implementations, smart sleep may be a second sleep state (e.g., a deep sleep state) with less power consumption than the first sleep state activated at block 616 described above. At block 620, some data (e.g., a minimum amount of usage data required to maintain the gaming experience) may be reported by the controller to the hub device (e.g., the server 410 of FIG. 4). At block 622, certain components (and associated power gates) in the controller that correspond to unnecessary functions (e.g., all components other than a timer circuit) may be disabled. Following block 622, method 600 may again proceed to block 610 to continue monitoring and recording the user's gaming behavior.

In some embodiments, the particular sleep state (and components of the wireless controller to disable) may be based on a motion level determined from motion sensor information received from the wireless controller (e.g., at block 612) when the wireless controller is not providing user input to the application (e.g., as determined at block 604). For example, when the motion level satisfies a first criterion (indicating a period of indoor movement with no gameplay), components other than a location determination circuit (or IMU) and the at least one motion sensor may be deactivated to place the controller in a first sleep state (e.g., at block 616). Additionally or alternatively, when the motion level satisfies a second criterion, components of the wireless controller other than a timer circuit may be deactivated to place the controller in a second sleep state or deep sleep state (e.g., at block 622). In some implementations, the power consumption for different subsets of components in the wireless controller may be controlled or adjusted for different power states based on the category of the gaming application.

Table 1 below provides examples of different power states for high duty and low duty components of a wireless controller associated with different categories of gaming applications.

TABLE 1

| Power state examples with designated duty | | | |
|---|---|---|---|
| Power state | Application Category | High duty | Low duty |
| Normal | Shooting game | Adaptive input controls (e.g., adaptive trigger, adaptive thumbsticks) | Haptic controls (e.g., rumble motors) |
| | Fighting game | Haptic controls; Omni-directional touchpad | Adaptive input controls |
| | Location-based game | Motion sensors (e.g., accelerometer and/or gyroscope); Lighting instrumentation/controls | Adaptive input controls; Haptic controls; Audio controls (e.g., Bluetooth) |
| Sleep | All | Motion sensors | Everything else |
| Deep Sleep | All | Timer | Everything else |

At a normal power state, the disclosed smart power saving techniques (e.g., using method 600 described above) may be used to keep learning the user's gaming behavior and adjust the duty of components in the wireless controller accordingly. As shown in the table above, components of the wireless controller may be designated as either high-duty components (e.g., designated at 100% duty) or low-duty components (e.g., designated at 20% duty) based on the game content or category of gaming application. In some implementations, the duty level for different subsets of components may be adjusted (e.g., by lowering the duty level) depending on the expected usage of components in that subset for a particular category of gaming application (and/or the user's gaming preferences). Lowering the duty of components may involve, for example and without limitation, lowering lighting brightness, decreasing a feedback level of the adaptive trigger, decreasing the frequency and magnitude of haptic feedback, or lowering the scan rate of a button or other touch control, or any combination of the foregoing. In some cases, the low-duty components may be deactivated or disabled altogether to maximize power savings (e.g., in the sleep state and/or deep sleep state).

An example operation of the wireless controller with different power state changes over time in accordance with aspects of the embodiments described above is shown by a chart 700 in FIG. 7.

FIG. 8 illustrates an example information handling system 800. Information handling system 800 may include a processor 802 (e.g., a central processing unit (CPU)), a memory (e.g., a dynamic random-access memory (DRAM)) 804, and a chipset 806. In some embodiments, one or more of the processor 802, the memory 804, and the chipset 806 may be included on a motherboard (also referred to as a mainboard), which is a printed circuit board (PCB) with embedded conductors organized as transmission lines between the processor 802, the memory 804, the chipset 806, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 802, the memory

804, the chipset 806, and/or other components may be organized as a System on Chip (SoC).

The processor 802 may execute program code by accessing instructions loaded into memory 804 from a storage device, executing the instructions to operate on data also loaded into memory 804 from a storage device, and generate output data that is stored back into memory 804 or sent to another component. The processor 802 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 802 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 806 may facilitate the transfer of data between the processor 802, the memory 804, and other components. In some embodiments, chipset 806 may include two or more integrated circuits (ICs), such as a northbridge controller coupled to the processor 802, the memory 804, and a southbridge controller, with the southbridge controller coupled to the other components such as USB 810, SATA 820, and PCIe buses 808. The chipset 806 may couple to other components through one or more PCIe buses 808.

Some components may be coupled to one bus line of the PCIe buses 808, whereas some components may be coupled to more than one bus line of the PCIe buses 808. One example component is a universal serial bus (USB) controller 810, which interfaces the chipset 806 to a USB bus 812. A USB bus 812 may couple input/output components such as a keyboard 814 and a mouse 816, but also other components such as USB flash drives, or another information handling system. Another example component is a SATA bus controller 820, which couples the chipset 806 to a SATA bus 822. The SATA bus 822 may facilitate efficient transfer of data between the chipset 806 and components coupled to the chipset 806 and a storage device 824 (e.g., a hard disk drive (HDD) or solid-state disk drive (SDD)) and/or a compact disc read-only memory (CD-ROM) 826. The PCIe bus 808 may also couple the chipset 806 directly to a storage device 828 (e.g., a solid-state disk drive (SDD)). A further example of an example component is a graphics device 830 (e.g., a graphics processing unit (GPU)) for generating output to a display device 832, a network interface controller (NIC) 840, and/or a wireless interface 850 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 806 may also be coupled to a serial peripheral interface (SPI) and/or Inter-Integrated Circuit (I2C) bus 860, which couples the chipset 806 to system management components. For example, a non-volatile random-access memory (NVRAM) 870 for storing firmware 872 may be coupled to the bus 860. As another example, a controller, such as a baseboard management controller (BMC) 880, may be coupled to the chipset 806 through the bus 860. BMC 880 may be referred to as a service processor or embedded controller (EC). Capabilities and functions provided by BMC 880 may vary considerably based on the type of information handling system. For example, the term baseboard management system may be used to describe an embedded processor included at a server, while an embedded controller may be found in a consumer-level device. As disclosed herein, BMC 880 represents a processing device different from processor 802, which provides various management functions for information handling system 800. For example, an embedded controller may be responsible for power management, cooling management, and the like. An embedded controller included at a data storage system may be referred to as a storage enclosure processor or a chassis processor.

System 800 may include additional processors that are configured to provide localized or specific control functions, such as a battery management controller. Bus 860 can include one or more busses, including a Serial Peripheral Interface (SPI) bus, an Inter-Integrated Circuit (I2C) bus, a system management bus (SMBUS), a power management bus (PMBUS), or the like. BMC 880 may be configured to provide out-of-band access to devices at information handling system 800. Out-of-band access in the context of the bus 860 may refer to operations performed prior to execution of firmware 872 by processor 802 to initialize operation of system 800.

Firmware 872 may include instructions executable by processor 802 to initialize and test the hardware components of system 800. For example, the instructions may cause the processor 802 to execute a power-on self-test (POST). The instructions may further cause the processor 802 to load a boot loader or an operating system (OS) from a mass storage device. Firmware 872 additionally may provide an abstraction layer for the hardware, such as a consistent way for application programs and operating systems to interact with the keyboard, display, and other input/output devices. When power is first applied to information handling system 800, the system may begin a sequence of initialization procedures, such as a boot procedure or a secure boot procedure. During the initialization sequence, also referred to as a boot sequence, components of system 800 may be configured and enabled for operation and device drivers may be installed. Device drivers may provide an interface through which other components of the system 800 can communicate with a corresponding device. The firmware 872 may include a basic input-output system (BIOS) and/or include a unified extensible firmware interface (UEFI). Firmware 872 may also include one or more firmware modules of the information handling system. Additionally, configuration settings for the firmware 872 and firmware of the information handling system 800 may be stored in the NVRAM 870. NVRAM 870 may, for example, be a non-volatile firmware memory of the information handling system 800.

Information handling system 800 may include additional components and additional busses, not shown for clarity. For example, system 800 may include multiple processor cores (either within processor 802 or separately coupled to the chipset 806 or through the PCIe buses 808), audio devices (such as may be coupled to the chipset 806 through one of the PCIe busses 808), or the like. While a particular arrangement of bus technologies and interconnections is illustrated for the purpose of example, one of skill will appreciate that the techniques disclosed herein are applicable to other system architectures. System 800 may include multiple processors and/or redundant bus controllers. In some embodiments, one or more components may be integrated together in an integrated circuit (IC), which is circuitry built on a common substrate. For example, portions of chipset 806 can be integrated within processor 802. Additional components of information handling system 800 may include one or more storage devices that may store machine-executable code, one or more communications ports for communicating with external devices, and various input and output (I/O) devices, such as a keyboard, a mouse, and a video display.

In some embodiments, processor 802 may include multiple processors, such as multiple processing cores for parallel processing by the information handling system 800. For example, the information handling system 800 may include a server comprising multiple processors for parallel processing. In some embodiments, the information handling system 800 may support virtual machine (VM) operation, with multiple virtualized instances of one or more operating systems executed in parallel by the information handling system 800. For example, resources, such as processors or processing cores of the information handling system may be assigned to multiple containerized instances of one or more operating systems of the information handling system 800 executed in parallel. A container may, for example, be a virtual machine executed by the information handling system 800 for execution of an instance of an operating system by the information handling system 800. Thus, for example, multiple users may remotely connect to the information handling system 800, such as in a cloud computing configuration, to utilize resources of the information handling system 800, such as memory, processors, and other hardware, firmware, and software capabilities of the information handling system 800. Parallel execution of multiple containers by the information handling system 800 may allow the information handling system 800 to execute tasks for multiple users in parallel secure virtual environments.

The schematic or flow diagrams of FIGS. 5 and 6 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Machine learning models, as described herein, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms such as adaptive boosting (AdaBoost) or stochastic gradient boosting systems for iteratively updating weighting to train a machine learning classifier to determine a relationship between an influencing attribute, such as received device data, and a system, such as an environment or particular user, and/or a degree to which such an influencing attribute affects the outcome of such a system or determination of environment.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A method comprising:
   receiving motion sensor information from at least one motion sensor of a wireless controller associated with a hub device;
   determining a power consumption profile for the wireless controller for interacting with the hub device, the power consumption profile based, at least in part, on the motion sensor information, wherein determining the power consumption profile comprises:

determining, based on the motion sensor information, whether the wireless controller is providing user input to an application executing on the hub device;

when the wireless controller is providing user input to the application: determining that the power consumption profile is a first profile, wherein determining the first profile comprises determining a first subset of components in the wireless controller to be controlled in a first power state and determining a second subset of components in the wireless controller to be controlled in a second power state, and wherein determining the first profile for controlling components of the wireless controller based on the application comprises:

when the application corresponds to a first category of gaming applications, the first subset of components comprises adaptive input controls and the second subset of components comprises rumble motors; and when the application corresponds to a second category of gaming applications, the first subset of components comprises rumble motors and the second subset of components comprises adaptive input controls; and when the wireless controller is not providing user input to the application: determining that the power consumption profile is a second profile; and controlling components of the wireless controller based on the power consumption profile for interacting with the hub device.

2. The method of claim 1, wherein, when the wireless controller is providing user input to the application, the method further comprises:

determining the first profile for controlling components of the wireless controller based on the application.

3. The method of claim 1, wherein, when the wireless controller is not providing user input to the application, the method further comprises:

determining a motion level of the wireless controller based on the motion sensor information;

when the motion level satisfies a first criterion, determining that the second profile for controlling components of the wireless controller corresponds to a first sleep state; and when the motion level satisfies a second criterion, determining that the second profile for controlling components of the wireless controller corresponds to a second sleep state with lower power consumption than the first sleep state.

4. The method of claim 3, wherein:

in the first sleep state, controlling the components of the wireless controller comprises de-activating components other than a location determination circuit and the at least one motion sensor; and in the second sleep state, controlling the components of the wireless controller comprises de-activating components other than a timer circuit.

5. An information handling system comprising:

a processor; and a memory coupled to the processor, the memory storing instructions that, when executed by the processor, cause the processor to perform operations including:

receiving motion sensor information from at least one motion sensor of a wireless controller;

determining a power consumption profile for the wireless controller based, at least in part, on the motion sensor information, wherein determining the power consumption profile comprises:

determining, based on the motion sensor information, whether the wireless controller is providing user input to an application executing on a hub device;

when the wireless controller is providing user input to the application: determining that the power consumption profile is a first profile, wherein determining the first profile comprises determining a first subset of components in the wireless controller to be controlled in a first power state and determining a second subset of components in the wireless controller to be controlled in a second power state, and wherein determining the first profile for controlling components of the wireless controller based on the application comprises:

when the application corresponds to a first category of gaming applications, the first subset of components comprises adaptive input controls and the second subset of components comprises rumble motors; and when the application corresponds to a second category of gaming applications, the first subset of components comprises rumble motors and the second subset of components comprises adaptive input controls; and when the wireless controller is not providing user input to the application: determining that the power consumption profile is a second profile; and transmitting, to the wireless controller, one or more control signals for controlling components of the wireless controller based on the power consumption profile.

6. The information handling system of claim 5, wherein the operations performed by the processor further include:

determining, based on the motion sensor information, whether the wireless controller is providing user input to an application executing on the hub device;

when the wireless controller is providing user input to the application: determining that the power consumption profile is a first profile; and when the wireless controller is not providing user input to the application:

determining that the power consumption profile is a second profile.

7. The information handling system of claim 6, wherein, when the wireless controller is not providing user input to the application, the operations performed by the processor further include:

determining a motion level of the wireless controller based on the motion sensor information;

when the motion level satisfies a first criterion, determining that the second profile for controlling components of the wireless controller corresponds to a first sleep state; and when the motion level satisfies a second criterion, determining that the second profile for controlling components of the wireless controller corresponds to a second sleep state with lower power consumption than the first sleep state.

8. The information handling system of claim 7, wherein the operations performed by the processor further include:

in the first sleep state, de-activating components other than a location determination circuit and the at least one motion sensor; and in the second sleep state, de-activating components other than a timer circuit.

9. A computer program product, comprising:

a non-transitory computer readable medium comprising code for performing steps comprising:

receiving motion sensor information from at least one motion sensor of a wireless controller associated with a hub device;

determining a power consumption profile for the wireless controller for interacting with the hub device, the power consumption profile based, at least in part, on the motion sensor information, wherein determining the power consumption profile comprises:

determining, based on the motion sensor information, whether the wireless controller is providing user input to an application executing on the hub device;

when the wireless controller is providing user input to the application: determining that the power consumption profile is a first profile, wherein determining the first profile comprises determining a first subset of components in the wireless controller to be controlled in a first power state and determining a second subset of components in the wireless controller to be controlled in a second power state, and wherein determining the first profile for controlling components of the wireless controller based on the application comprises:

when the application corresponds to a first category of gaming applications, the first subset of components comprises adaptive input controls and the second subset of components comprises rumble motors; and when the application corresponds to a second category of gaming applications, the first subset of components comprises rumble motors and the second subset of components comprises adaptive input controls; and when the wireless controller is not providing user input to the application: determining that the power consumption profile is a second profile; and controlling components of the wireless controller based on the power consumption profile for interacting with the hub device.

10. The computer program product of claim 9, wherein determining the power consumption profile comprises:

determining, based on the motion sensor information, whether the wireless controller is providing user input to an application executing on a hub device;

when the wireless controller is providing user input to the application: determining that the power consumption profile is a first profile; and when the wireless controller is not providing user input to the application:

determining that the power consumption profile is a second profile.

11. The computer program product of claim 10, wherein, when the wireless controller is not providing user input to the application, the steps further comprise:

determining a motion level of the wireless controller based on the motion sensor information;

when the motion level satisfies a first criterion, determining that the second profile for controlling components of the wireless controller corresponds to a first sleep state; and when the motion level satisfies a second criterion, determining that the second profile for controlling components of the wireless controller corresponds to a second sleep state with lower power consumption than the first sleep state.

* * * * *